United States Patent
Potts

[19]

[11] Patent Number: 6,041,540
[45] Date of Patent: Mar. 28, 2000

[54] REALISTIC ARTIFICIAL SOFT PLASTIC FISHING LURE

[76] Inventor: Carl J. Potts, 1001 Waite Dr., Boulder, Colo. 80303

[21] Appl. No.: 09/087,108

[22] Filed: May 29, 1998

[51] Int. Cl.[7] .................................................. A01K 85/00
[52] U.S. Cl. ...................... 43/42.24; 43/42.47; 43/42.08
[58] Field of Search ................ 43/42.24, 42.47, 43/42.08

[56] References Cited

U.S. PATENT DOCUMENTS

| | | | |
|---|---|---|---|
| 1,010,481 | 12/1911 | Crane et al. | 43/42.24 |
| 1,138,896 | 5/1915 | Ryan | 43/42.47 |
| 1,368,939 | 2/1921 | Kelley | 43/42.24 |
| 1,499,819 | 7/1924 | Goble | 43/42.24 |
| 1,777,004 | 9/1930 | Lemere et al. | 43/42.24 |
| 2,149,054 | 2/1939 | Jones | 43/42.24 |
| 2,235,600 | 3/1941 | Ammerman | 43/42.24 |
| 2,281,578 | 5/1942 | Heddon | 43/42.47 |
| 2,741,058 | 4/1956 | Allman | 43/42.24 |
| 2,776,518 | 1/1957 | Felmlee | 43/42.24 |
| 3,070,917 | 1/1963 | Rowe, Sr. | 43/42.24 |
| 3,186,120 | 6/1965 | Layson | 43/42.24 |
| 3,685,192 | 8/1972 | Stibbard | 43/42.04 |
| 3,760,528 | 9/1973 | Moore | 43/42.24 |
| 4,214,396 | 7/1980 | Firmin | 43/42.24 |
| 4,429,482 | 2/1984 | Honse | 43/42.32 |
| 4,750,290 | 6/1988 | Renaud | 43/42.29 |
| 4,783,928 | 11/1988 | Weaver | 43/42.24 |
| 4,785,569 | 11/1988 | Thomas, Jr. | 43/42.31 |
| 4,953,319 | 9/1990 | Kasper et al. | 43/42.06 |
| 4,998,372 | 3/1991 | Reed | 43/42.24 |
| 5,070,639 | 12/1991 | Pippert | 43/42.31 |
| 5,193,299 | 3/1993 | Correll et al. | 43/42.47 |
| 5,209,007 | 5/1993 | Southerland, Jr. | 43/42.09 |
| 5,379,544 | 1/1995 | Davidson | 43/42.24 |
| 5,586,405 | 12/1996 | Fike | 43/42.31 |
| 5,640,798 | 6/1997 | Garst | 43/42.53 |
| 5,893,231 | 4/1999 | Kato | 43/42.24 |

OTHER PUBLICATIONS

"3 in a Row", 1996, Ward.

*Primary Examiner*—Michael J. Carone
*Assistant Examiner*—Fredrick T. French, III

[57] ABSTRACT

A realistic looking and acting soft plastic fishing lure that has realistic details, such as gill plates, and can be used singly or in "schools" where each lure has a great degree of independent movement and contains its own hook. The lure has built-in eye sockets that accept realistic artificial eyes, a V-shaped dorsal fin that adds to the lure's realistic shape, hides the hook point and protects it from snagging weeds. The lure also has a built-in rattle and scent chamber along with built-in slots to hold Y-shaped weed guards, a thin tail that flutters when the lure is allowed to fall, a slot in the belly of the lure that allows for the main part of the hook to remain hidden and reduces the amount of plastic the hook has to be pulled through in order to set the hook when a fish strikes.

6 Claims, 4 Drawing Sheets

REALISTIC ARTIFICIAL SOFT PLASTIC FISHING LURE

BACKGROUND OF THE INVENTION

1. Field of the Invention

The present invention relates to a realistic fishing lure that can be used individually or tied in a series by anglers in order to entice predatory fish to bite the lure(s).

2. Description of the Related Art

With ever increasing numbers of ever more skilled fishermen attempting to catch fish in waters that see a lot of fishing pressure, lures need to closely duplicate the look, feel, action and sound of real baitfish in order to fool predatory fish that have seen, and been caught by, numerous lures. Today, many sport fishermen practice "Catch And Release" fishing, they release caught fish unharmed back into the water from which they were taken. This results in a very wary fish population that is conditioned and cautious about being fooled again by lures. Those fish that are harvested to be eaten or mounted as trophies add to this trend towards lure-shy fish populations since the more gullible fish are harvested and the cautious and/or conditioned fish remain in the water.

The "Soft Stick-bait" is one trend in fishing lures designed to help overcome the natural and learned cautiousness of predatory fish. Soft Stick-baits are elongated soft plastic lures that imitate the disorientated and erratic movement of a wounded or pursued baitfish. Short, sharp and erratic twitches of the fishing rod tip prompt this erratic movement, often triggering strikes by predatory gamefish.

Soft stick-baits are usually fairly featureless chunks of elongated soft plastic that do not look very much like the baitfish their actions are supposed to duplicate. The lure in U.S. Pat. No. 4,998,362 to Reed, has little resemblance to a baitfish in appearance.

The present invention is shaped much more like a baitfish than other soft stick-baits, while still retaining the unpredictable and erratic action that are part of a stick-bait's characteristics. In addition to its more realistic overall shape and silhouette, the present invention has a dorsal fin, a thin tail and molded details such as eye sockets and gill plates. The eye sockets accept very realistic moving doll eyes that rattle when the lure is moved. The belly of the lure has a slot where the hook sits out of view of the fish, adding to the lure's natural appearance. The point of the hook is hidden by the split V-shaped dorsal fin where it is protected from weeds while being in perfect position to strike when a fish bites the lure.

Real baitfish usually travel in schools. A school of fleeing, frantic and disoriented baitfish creates even more aggression in predatory fish than an individual baitfish. Predatory fish have a chance to consume a larger meal when they attack a school of baitfish. If there are multiple predatory fish in the same area, competition between the predators for the disorientated prey can be fierce. One predatory fish will often try to grab prey from the mouth of another fish predator.

Artificially duplicating a school of disoriented and frantic baitfish should increase the chances for successful strikes from predatory fish. One soft plastic lure, the "3 in A Row" made by the Fred Ward Lure Company attempts to duplicate a small school of baitfish by creating a long lure with the design of three baitfish printed on the lure. The "3 In A Row" is in fact only a single lure, so the three printed baitfish on the lure can not move with any significant degree of independence. The "3 In A Row" uses a single hook.

The present invention can string together several duplicate lures by common fishing line, each lure with its own hook. This creates the appearance of a school of realistic looking and acting baitfish, all controlled by one fishing pole but each free to move erratically due to the flexibility of the fishing line connections. Since each of the present invention's lures in the school has its own hook, it is very possible to catch more than one predatory fish at one time.

BRIEF SUMMARY OF THE INVENTION

In accordance with the present invention a realistic artificial soft plastic fishing lure with a thin fluttering tail with hook protecting V-shaped dorsal fin, hook-hiding ventral hook slot, realistic eye sockets that accept eye inserts, slots for rattles, scents and weed guards, and that can be used singly or in multiple strings to create a lure school.

Figure 1:
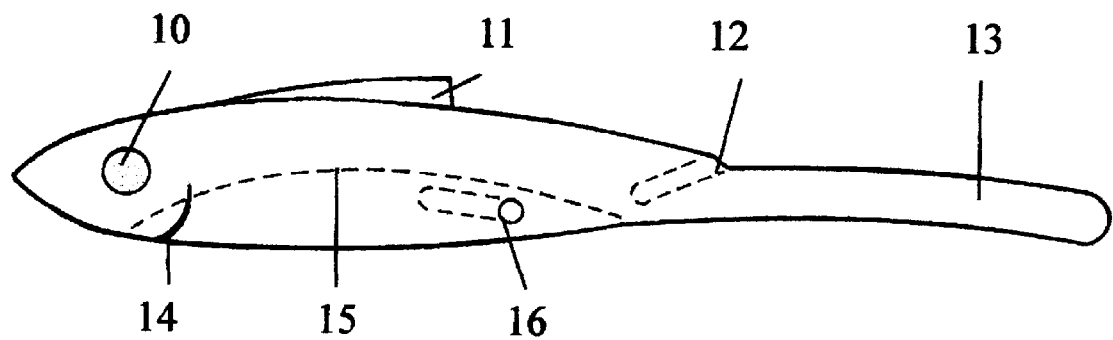
FIG. 1 shows various aspects of a lure from a side view.

REFERENCE NUMERALS IN DRAWINGS 10 eye socket
11 V-shaped dorsal fin
12 rattle/scent chamber
13 thin tail
14 gill plate
15 ventral hook slot
16 weed guard slot
17 eye insert
18 Y fiber weed guard
19 hook
19.A hook point
19.B hook attachment barb
20 line knot attachment
21 rattle
22 line to following lure in "school"

OBJECTS AND ADVANTAGES

Accordingly, besides the objects and advantages of providing very realistic shape and action for fishing lures, several objects and advantages of the present invention are:

(a) to provide built-in eye sockets that accept eye inserts of various types including realistic plastic doll eyes that emit fish attracting rattling noise when the lure is manipulated by the angler;

(b) to provide a V-shaped dorsal fin that adds to the present invention's realistic shape and also hides the hook point and protects it from snagging weeds;

(c) to provide a built-in rattle and scent chamber;

(d) to provide built-in slots to hold Y-shaped weed guards for when treble "stinger" hooks are used;

(e) to provide a thin tail that flutters when the lure is allowed to fall through water, adding to the lure's realism and attractiveness;

(f) to provide a slot in the belly of the lure that allows for the main part of the hook to remain hidden and also reduces the amount of plastic the hook has to be pulled through in order to set the hook when a fish strikes;

(g) to provide the ability to create a school of lures wherein each lure in the school moves with maximum independence while being controlled by a single fishing rod.

Still further objects and advantages will become apparent from a consideration of the ensuing description and drawings.

DETAILED DESCRIPTION OF DRAWINGS

Figure 2:
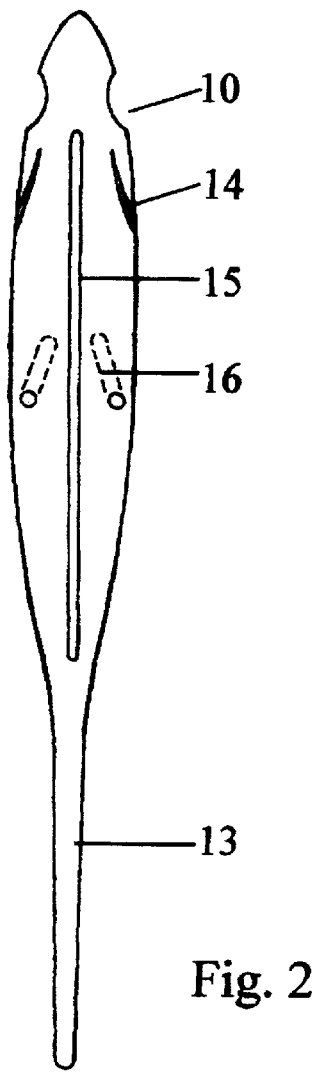
FIG. 2 shows various aspects of a lure from a bottom view.
Figure 3:
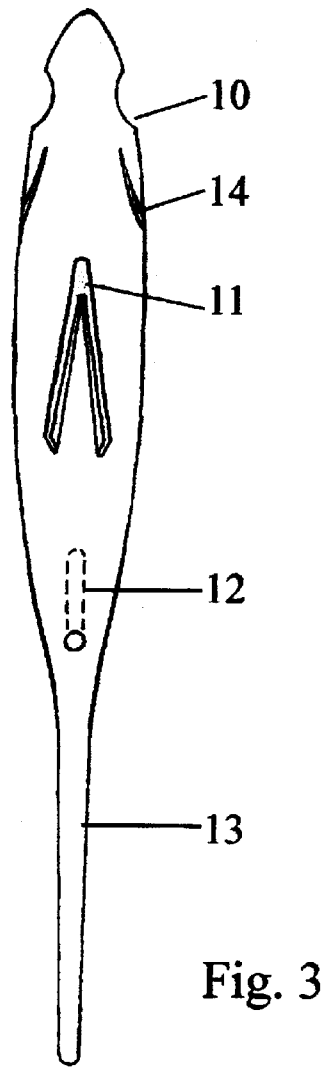
FIG. 3 shows various aspects of a lure from a top view.
Figure 4:
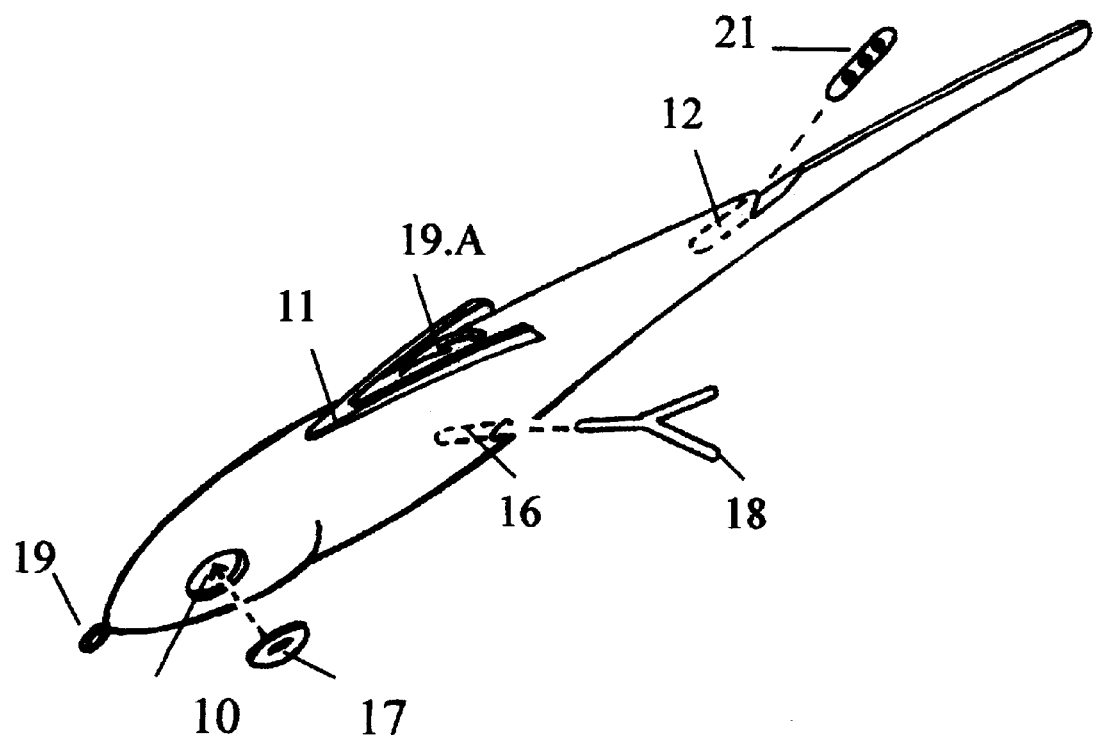
FIG. 4 shows a lure in a down ¾ view with built-in and add-on features such as rattle and rattle chamber, eye socket and doll eye, hook point position within the V-shaped dorsal fin and Y fiber weed guard and weed guard slot.
Figure 5:
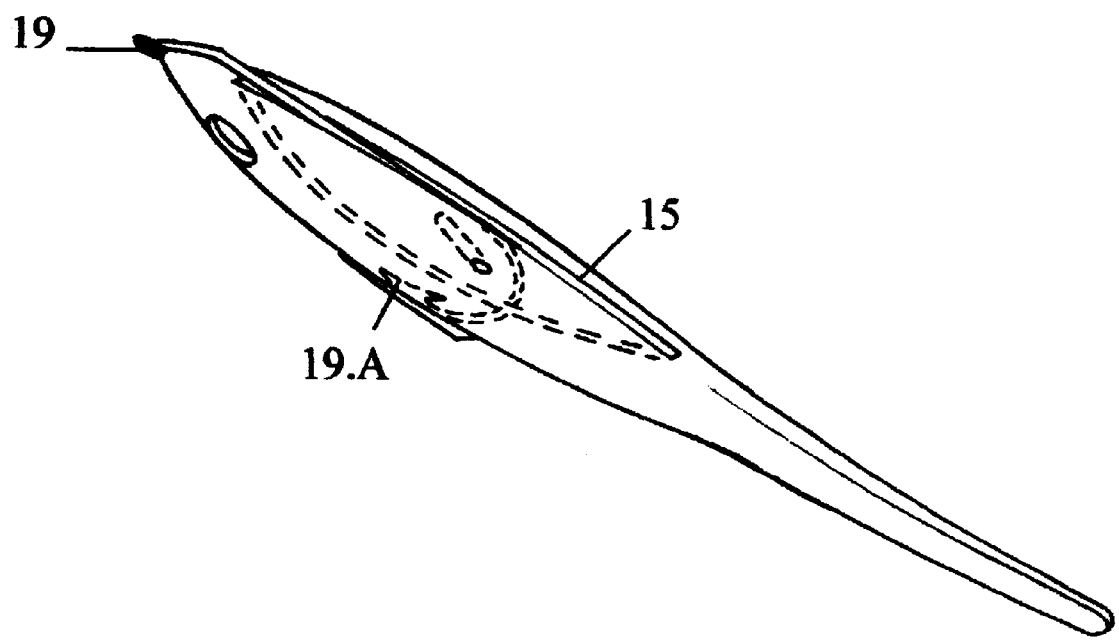
FIG. 5 shows a lure in an up ¾ view with the built-in belly hook slot feature and the hook's position in it.
Figure 6:
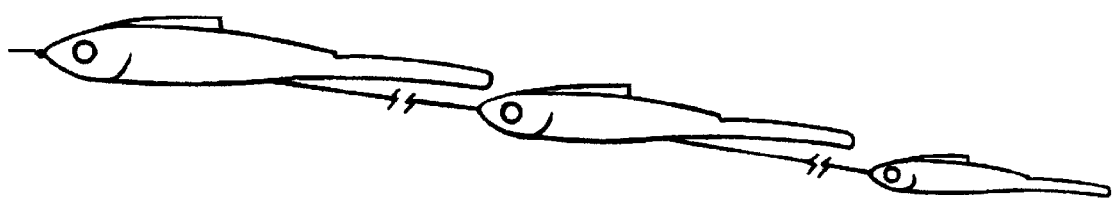
FIG. 6 shows, from a side view, how the lures can be strung together to form the appearance of a school of baitfish.
Figure 7:
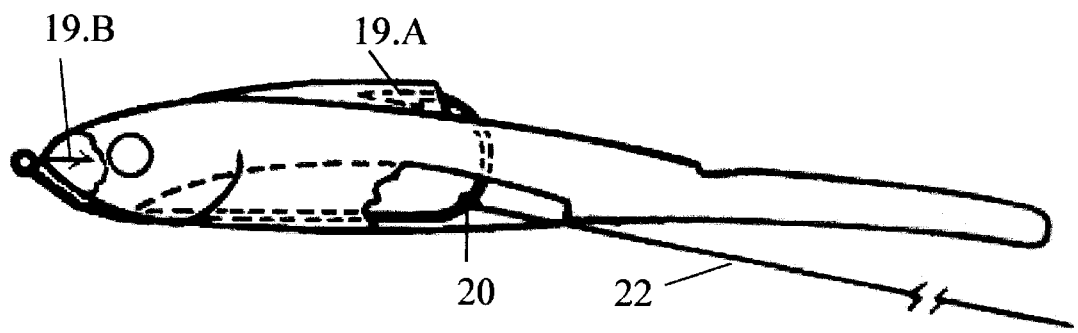
FIG. 7 shows a side view close up of the hook position and connecting fishing line on one lure on the lure "school".

Typical embodiments of the present invention are illustrated in FIG. 1 (side view), FIG. 2 (bottom view), FIG. 3 (top view), FIG. 4 (down ¾ view), FIG. 5 (up ¾ view), FIG. 6 (side view of multiple connected lures) and FIG. 7 (cutaway side view of how multiple lures are connected). The lure has an eye socket 10 on either side of the head that accepts realistic eye inserts 17. A V-shaped dorsal fin 11 that adds a realistic profile to the lure and protects the main hook point 19.A from snagging weeds. At the dorsal base of the tail is an elongated void space 12 designed to accept a small rattle 21 or fish-attracting scent. The tail of the lure 13 is thin, allowing the tail to flutter when the lure glides and falls upon retrieval through water. Gill plates 14 add to the realistic detail of the lure. The ventral/belly part of the lure has a hook slot 15 to hide the main part of the hook 19 and to minimize the amount of plastic the hook has to be pulled through when the hook is set on a fish. Two more elongated void spaces 16, one on each side of the lure, are designed to accept Y-shaped fiber weed guards 18 when treble stinger hooks are added to the lure.

Multiples of the lure can be connected by fishing line (FIG. 6) to each other, creating the effect of a school of baitfish. Each lure has its own hook so it doesn't matter which lure in the school a fish strikes. This arrangement also allows for more than one fish to be caught at one time when multiple fish strike more than one lure in the school.

Lures in a school are connected by tying a knot in the fishing line on the rear shank of the hook in one lure 20 (FIG. 7), running the line 22 to the eye of the hook in a following lure and securing it there with a knot.

The front of the hook is secured to the lure either by inserting the top of the hook in the front of the lure (commonly referred to as a "Texas rig") or by the use of a barbed extension from the hook eye 19.B.

Figure 9:
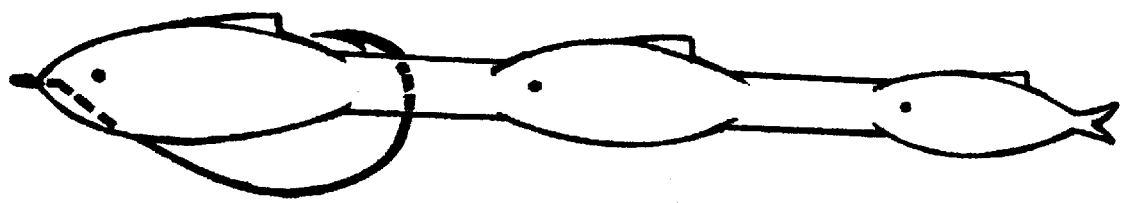
FIG. 9 shows how the "3 In A Row" (Patent pending) made by the Fred Ward Lure Company attempts to duplicate a small school of baitfish by creating a long lure with the design of three baitfish printed on the lure.
Figure 10:
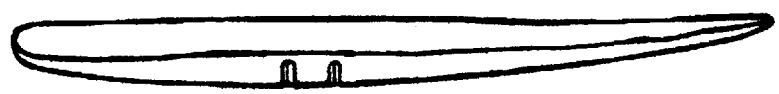
FIG. 10 shows an example, from U.S. Pat. No. 4,998,362 to Reed, how other soft stick-baits bear little resemblance to a baitfish in appearance.

Other typical soft stick-bait plastic lures are shown in FIGS. 9 & 10. FIG. 9 shows how the "3 In A Row" (Patent pending) made by the Fred Ward Lure Company attempts to duplicate a small school of baitfish by creating a long lure with the design of three simulated baitfish printed on the lure. A single hook is used at the front of the lure, greatly reducing the odds that a fish striking the second or third simulated baitfish will be hooked. Herb Reed's "Sluggo" soft stick-bait is shown in FIG. 10. (from U.S. Pat. No. 4,998,362 to Reed, shows how other soft stick-baits bear little resemblance to a baitfish in appearance.

Figure 8:
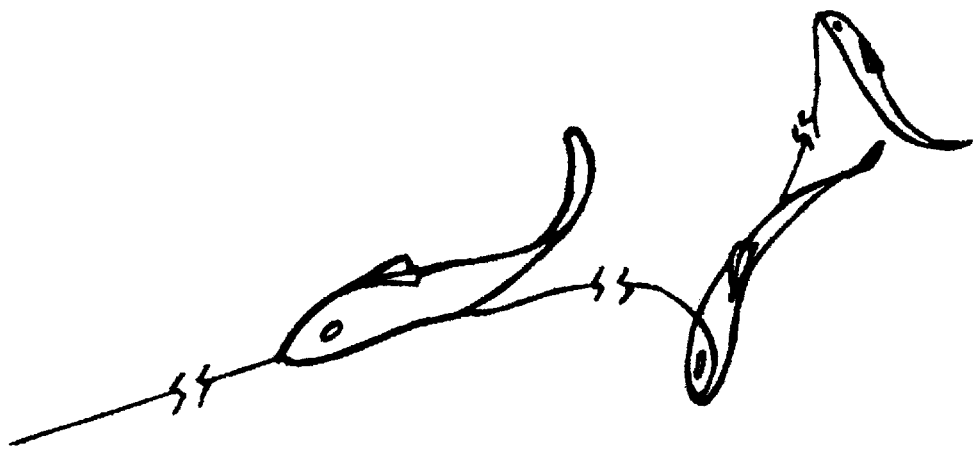
FIG. 8 shows individual lures in a "school" darting and gliding in different directions between twitches of the fishing rod.

The lure darts, glides and falls in an erratic manner as the angler twitches the rod tip. When connected in a school, each lure is provided a large degree of individual movement (FIG. 8) due to the flexibility of the connecting fishing line and to the inherent shape and flexibility of the lures.

CONCLUSION, RAMIFICATIONS AND SCOPE

Accordingly, the reader will see that this invention looks much more like a true baitfish that other "soft stick-baits" with its overall shape and details such as eyes, dorsal fin, thin fluttering tail, and gill plates. The realistic artificial soft plastic fishing lure can be used singly or in multiples to create a school of individual artificial baitfish. The lure, whether used singly or in multiples, moves in an erratic manner, much as a wounded or disorientated baitfish does, when the angler manipulates the lure(s) with twitches of the fishing rod tip. When at rest between rod twitches, the lure falls slowly while the thin tail flutters as though the lure is a living creature. Rattles, treble "stinger" hooks, weights, weed guards and fish-attracting scents can all be easily added to the lure by insertion into the various cavities built-in to the lure. The main hook is largely hidden inside the lure, sitting in the ventral hook slot with the point hidden and protected from weeds by the V-shaped dorsal fin. Furthermore, the realistic artificial soft plastic fishing lure has the additional advantages that:

- it can be produced a wide range of sizes;
- it can be produced in a wide range of colors;
- it can be produced by using injection molds;
- it can be produced with various fish-attracting scents mixed in with or added to the surface of the plastic used to make the lures;
- it can be produced in a range of consistencies (firmness or softness) by adding standard hardeners and softeners to the plastics;
- it may be made using some current and future plastics, foams, etc.; and
- it can be fished at a wide range of depths by the addition of weights either in the lure or attached to the fishing line ahead of the lure.

Although the description above contains many specificities, these should not be construed as limiting the scope of the invention but as merely providing illustrations of some of the presently preferred embodiments of this invention. For example, the lure can add other fins, different shaped thin tails, different "add-ons" such as a feather fins, diving bill, etc.

Thus the scope of the invention should be determined by the appended claims and their legal equivalents, rather than by the examples given.

I claim:

1. A soft plastic fishing lure comprising a fishing hook having a shaft, an eye, a curved portion and a hook point;

an elongated fish-like body, said elongated fish-like body having a V-shaped dorsal fin along an upper portion of the elongated fish-like body, said V-shaped dorsal fin having two arms and an apex from which the two arms diverge from one another forming the V-shape, the apex of the V-shaped dorsal fin located forward of the diverging arms of the V-shaped dorsal fin along the elongated fish-like body, said arms being outwardly disposed from said elongated fish-like body forming a space between said arms of said V-shaped dorsal fin, a ventral hook slot providing an opening in the underside of the elongated fish-like body, wherein the shaft and curved portion of the fishing hook being disposed and concealed within the ventral hook slot in the underside of the elongated fish-like body, the eye of the fishing hook extending from a front portion of the elongated fish-like body, and the hook point extending through the upper portion of the elongated fish-like body to an exterior thereof and being concealed and protected within the space formed between the arms of the V-shaped dorsal fin preventing entanglement and snagging of the fishing hook.

2. A soft plastic fishing lure according to claim 1 further comprising void spaces in the elongated fish-like body for receiving fish attracting elements.

3. A soft plastic fishing lure according to claim 1 further comprising void spaces in the elongated fish-like body for receiving fiber hook weed guard elements.

4. A fishing system comprising a plurality of soft plastic fishing lures attached in a linear arrangement, said soft plastic fishing lures comprising a fishing hook having a shaft, an eye, a curved portion and a hook point;

an elongated fish-like body, said elongated fish-like body having a V-shaped dorsal fin along an upper portion of the elongated fish-like body, said V-shaped dorsal fin having two arms and an apex from which the two arms diverge from one another forming the V-shape, the apex of the V-shaped dorsal fin located forward of the diverging arms of the V-shaped dorsal fin along the elongated fish-like body, said arms being outwardly disposed from said elongated fish-like body forming a space between said arms of said V-shaped dorsal fin, a ventral hook slot providing an opening in the underside of the elongated fish-like body, wherein the shaft and curved portion of the fishing hook being disposed and concealed within the ventral hook slot in the underside of the elongated fish-like body, the eye of the fishing hook extending from a front portion of the elongated fish-like body, and the hook point extending through the upper portion of the elongated fish-like body to an exterior thereof and being concealed and protected within the space formed between the arms of the V-shaped dorsal fin preventing entanglement and snagging of the fishing hook.

5. A soft plastic fishing lure according to claim 4 further comprising void spaces in the elongated fish-like body for receiving fish attracting elements.

6. A soft plastic fishing lure according to claim 1 further comprising void spaces in the elongated fish-like body for receiving fiber hook weed guard elements.

* * * * *